United States Patent [19]

Ishika

[11] Patent Number: 5,719,835
[45] Date of Patent: Feb. 17, 1998

[54] LIGHT DETECTING DEVICE FOR RECEIVING LIGHT FROM CORRESPONDING PORTIONS OF A RECORDING MEDIUM

[75] Inventor: Sou Ishika, Kanagawa-ken, Japan

[73] Assignee: Kabushiki Kaisha Toshiba, Kawasaki, Japan

[21] Appl. No.: 614,725

[22] Filed: Mar. 13, 1996

[30] Foreign Application Priority Data

Mar. 14, 1995 [JP] Japan ................................. 7-054768
Mar. 14, 1995 [JP] Japan ................................. 7-054772

[51] Int. Cl.$^6$ ............................................. G11B 7/00
[52] U.S. Cl. .................................. 369/44.26; 369/44.42
[58] Field of Search ........................... 369/44.26, 44.41, 369/44.42, 109, 103, 44.23, 44.12

[56] References Cited

U.S. PATENT DOCUMENTS

| | | | |
|---|---|---|---|
| 4,841,509 | 6/1989 | Kamisada et al. | 369/44.42 |
| 5,113,386 | 5/1992 | Whitehead | 369/44.41 |
| 5,231,620 | 7/1993 | Ohuchida | 369/44.14 |
| 5,272,329 | 12/1993 | Nagahama et al. | 369/44.12 |
| 5,289,443 | 2/1994 | Maeda et al. | 369/44.41 |
| 5,353,267 | 10/1994 | Katayama | |
| 5,553,051 | 9/1996 | Sugiyama et al. | 369/109 |

FOREIGN PATENT DOCUMENTS

| | | |
|---|---|---|
| 0 238 055 | 9/1987 | European Pat. Off. . |
| 0 440 963 | 8/1991 | European Pat. Off. . |
| 0 588 305 | 3/1994 | European Pat. Off. . |
| 38 04 701 | 9/1988 | Germany . |

*Primary Examiner*—Thang V. Tran
*Attorney, Agent, or Firm*—Cushman, Darby & Cushman IP Group of Pillsbury Madison & Sutro LLP

[57] ABSTRACT

A light detecting device includes an object leans for leading a light beam from a light source to a recording medium. The recording medium has a groove and a header portion formed by interrupting the groove. The light detecting device further includes a photo-detector for detecting the light beam reflected on the recording medium and led by the object lens to output a signal corresponding to intensity of the reflected light beam, the photo-detector including a light beam detecting surface in a specified shape to which a component of the reflected light beam diffracted by the header portion is not incident.

11 Claims, 5 Drawing Sheets

LIGHT DETECTING DEVICE FOR RECEIVING LIGHT FROM CORRESPONDING PORTIONS OF A RECORDING MEDIUM

BACKGROUND OF THE INVENTION

1. Field of the Invention

The present invention relates to a light detecting device which applies an optical beam to an optical disk as a recording medium to record/reproduce information.

2. Description of the Related Art

An information recording/reproducing apparatus, that is, an optical disk apparatus contains a light detecting device having an object lens and photo-detectors. That is, the optical disk apparatus applies an optical beam to the recording surface of the optical disk through this optical head device. Information recorded on the optical disk is read and information is recorded on the optical disk by applying the optical beam.

Nowadays, a process shown below has been proposed for increasing data recording density on the optical disk. That is, recording pits on the optical disk are made more fine, spaces between recording pits formed on the tracks of the optical disk are reduced and the sensitivity of photo-detectors to detect a laser beam reflected from the optical disk is increased. These can be achieved by reducing the diameter of the laser beam applied to the optical disk by the optical head device.

However, a size of recording pits is restricted depending on a wavelength of the laser beam supplied from a laser element, a process for reducing size and forming spaces of recording pits is inevitably limited.

On the contrary, when increasing sensitivity of photo-detectors, increased noise component in signals reproduced from the optical disk will cause a problem. In addition, the optical disk may have a header portion wherein no information is recorded on tracks or recorded information is interrupted. Accordingly, in addition to original signal components, a diffracted laser beam or a scattered laser beam caused by this header portion is incident to the photo-detectors. Therefore, if the sensitivity of the photo-detectors is increased unnecessarily, there will be a problem such that fluctuation in output gain may be increased.

SUMMARY OF THE INVENTION

It is an object of the present invention to provide a light detecting device which is capable of accurately reproducing information recorded on recording media.

The present invention provides a light detecting device comprising means for leading a light beam from a light source to a recording medium having a groove and a header portion formed by interrupting the groove; and means for detecting the light beam reflected on the recording medium and led by the leading means to output a signal corresponding to intensity of the reflected light beam. The light beam detecting means including a light beam detecting surface in a specified shape to which non-signal component light beam contained in the reflected light beam is not incident.

Further, the present invention provides a light detecting device comprising means having an optical axis for leading a light beam along the optical axis from a light source to a recording medium; wave front splitting means for splitting the light beam reflected on the recording medium for each of diffracted light groups generated depending on characteristic of the surface of the recording medium; and means for detecting the reflected light beam from the recording medium passed through the wave front splitting means after being led by the leading means to output a signal corresponding to intensity of the reflected light beam. The light beam detecting means including a light beam detecting surface in a specified shape to which a non-signal component light beam contained in the reflected light beam is not incident.

DETAILED DESCRIPTION OF THE PREFERRED EMBODIMENTS

Figure 1:
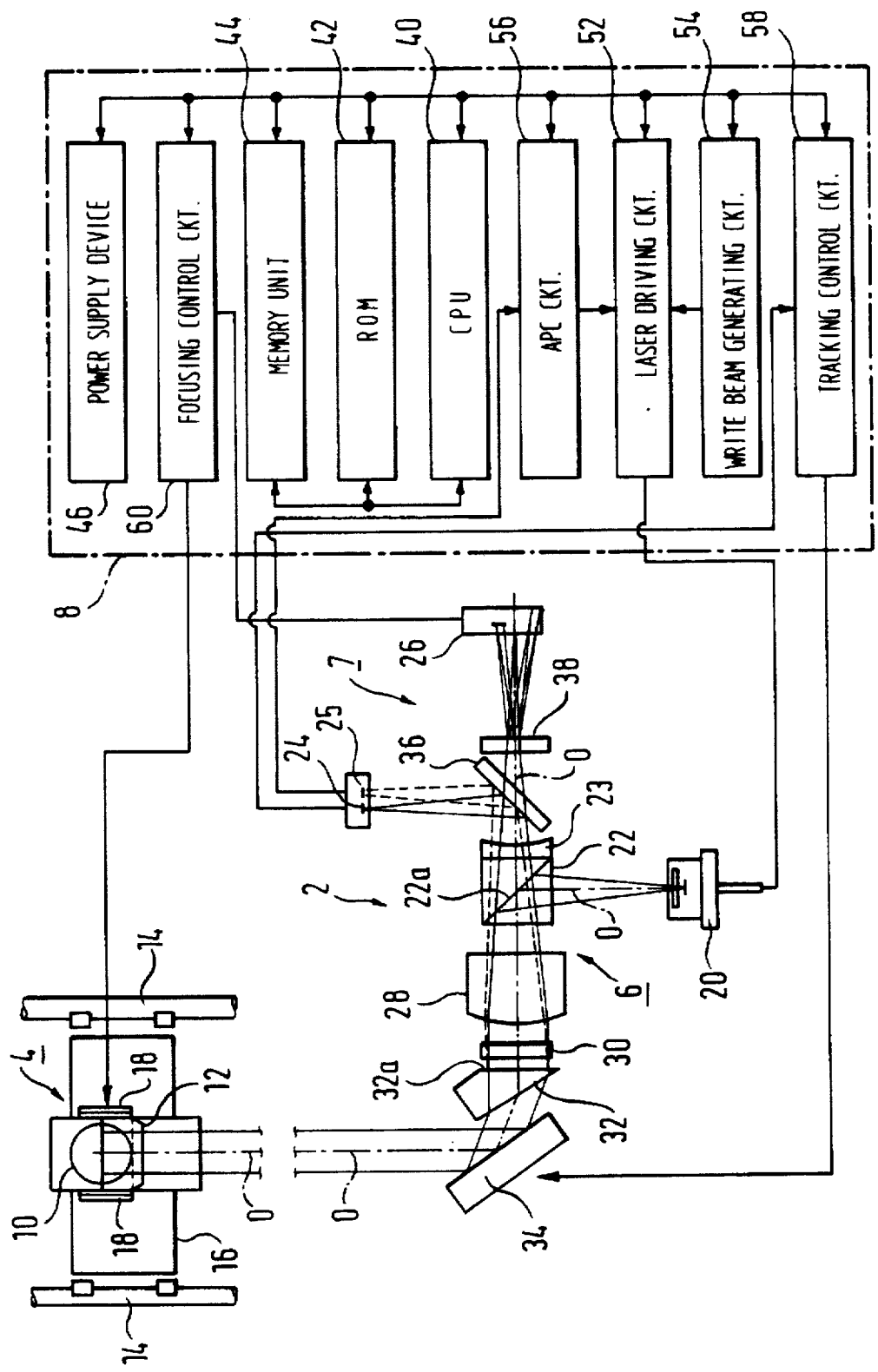
FIG. 1 is a schematic diagram showing an information recording/reproducing apparatus applied with a light detecting device of an embodiment of the present invention.

FIG. 1 shows an information recording/reproducing apparatus applied with a light detecting device involved in an embodiment of the present invention.

The information recording/reproducing apparatus, that is, an optical disk apparatus 2 contains an actuator 4 which applies a laser beam toward the recording surface of an optical disk (not shown) as a recording medium and takes out the laser beam reflected on the recording surface of the optical disk. The optical disk apparatus 2 has further a sending/receiving portion 6 which sends the laser beam in a specified wavelength toward the actuator 4 and receives the laser beam returned from the actuator 4, and a detecting portion 7 which detects laser beams from the actuator 4 via the sending/receiving portion 6. Further, the optical disk apparatus 2 has a signal processor 8 which forms a laser beam modulation signal to generate a laser beam corresponding to information to be recorded on an optical disk and reproduces information taken out of an optical disk.

The actuator 4 focuses a laser beam from a laser element 20, which will be described later, of the sending/receiving portion 6 on a specified position on the recording surface of an optical disk (not shown). The actuator 4 is provided with an object lens 10 for taking out a laser beam reflected on the optical disk. In addition, the actuator 4 includes a lens holder 12 which supports the object lens 10 movable along the recording surface of the optical disk in the direction orthogonal to the recording surface and in the direction crossing tracks (grooves) formed on the recording surface of the optical disk. Further, the actuator 4 is movable on a pair of guide rails 14, and is placed on a carriage 16 which is movable in the radial direction along the recording surface of the optical disk and supported movable in the radial direction of the optical disk when the carriage 16 moves. The lens holder 12 has a focusing coil 18 in one united body for generating a thrust to move the object lens 10 in the direction orthogonal to the recording surface of the optical disk.

The sending/receiving portion 6 has a polarizing beam splitter 22 which guides a laser beam from the laser element 20, which is a light source for generating a divergent laser beam of which sectional shape, that is, a beam spot is oval, to the recording surface of the optical disk and on the other hand, separates the laser beam reflected on the recording surface of the optical disk from the laser beam going to the optical disk. The detecting portion 7 has a first and a second photo-detectors 24 and 26 for receiving the reflected beams from the recording surface of the optical disk through the polarizing beam splitter 22 and converting to electric signals.

The polarizing beam splitter 22 has a polarizing beam split surface 22a of which polarized surface is defined in the direction orthogonal to the direction of polarized surface of the laser beam from the laser element 20 and diffracts laser beams from the laser element 20 by 90 degree and allows the laser beam reflected on the optical disk to pass it. Further, there is a concave lens 23 arranged in one united body with the polarizing beam splitter 22 at the reflected laser beam emitting side.

The first photo-detector 24 is used for detecting an out of track signal, which will be described later, for aligning the object lens 10 with the track of the recording surface of the optical disk. The first photo-detector 24 has four divided detecting areas 24A, 24B, 24C and 24D as shown in FIG. 2B which will be described later. Further, the first photo-detector 24 has been incorporated with a monitor photo-detector 25 which monitors variation in intensity of the laser beam in connection with APC (Auto Power Control) described later for maintaining an intensity of the laser beam generated by the laser element 20 at a constant level.

Figure 4A:
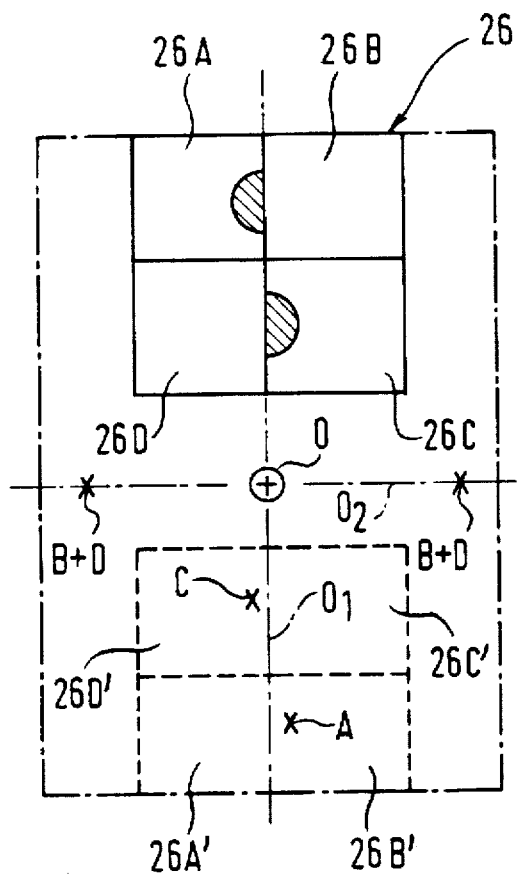
FIG. 4A is a schematic plan view showing laser beam patterns projected on detecting areas of the focusing photo-detector of the light detecting device shown in FIG. 1.

The second photo-detector 26 is used for detecting an out of focus signal, which will be described later, for aligning the focusing of the object lens 10 with the recording surface of the optical disk. The second photo-detector 26 has four split detecting areas 26A, 26B, 26C and 26D as shown in FIG. 4A which is described later.

Between the polarizing beam splitter 22 and the actuator 4, there are arranged a collimator lens 28 which converts a divergent laser beam transmitted from the laser element 20 into a parallel laser beam, a quarter wave plate 30 for changing the direction of the polarizing surface of the laser beam toward the optical disk from the laser element 20 and the direction of the polarizing surface of the laser beam returning to the polarizing beam splitter 22 from the optical disk by 90 degree, and a correction prism 32 for shaping the beam spot shape of the laser beam generated from the laser element 20 from an oval to a round shape in order.

The polarizing beam splitter 22 side surface of the correction prism 32, that is, an incident surface 32a is tilted by a specified angle against an optical axis of the system defined between the laser element 20 and the object lens 10 in order to return a part of the laser beam going to the object lens 10 to the polarizing beam splitter 22. In addition, the incident surface 32a of the correction prism 32 is formed in a mirror surface to reflect the laser beam supplied from the laser element 20 by more than 1% but less than 50%.

Between the correction prism 32 and the actuator 4, a galvano-mirror 34 is arranged for optically connecting the laser element 20, that is, the sending/receiving portion 6 with the actuator 4 and for aligning the center of the laser beam passing through the object lens 10 of the actuator 4 and the center of the track of the recording surface of the optical disk. An angle formed by the optical axis O of the system between the laser element 20 and the object lens 10 with the galvano-mirror 34 has been so formed that it is changeable within a specified range for the purpose of tracking that will be described later.

Between the polarizing beam splitter 22 and the first and the second photo-detectors 24 and 26, there is provided a beam splitter (a half mirror) 36 for splitting the laser beam transmitted from the polarizing beam splitter 22 into two laser beams at an equal ratio.

Between the second photo-detector 26 and the beam splitter 36, there is a hologram plate (a diffraction element) 38 which provides a specified optical characteristic for detecting whether one of the laser beams split by the beam splitter 36 is out of focus.

Figure 3A:
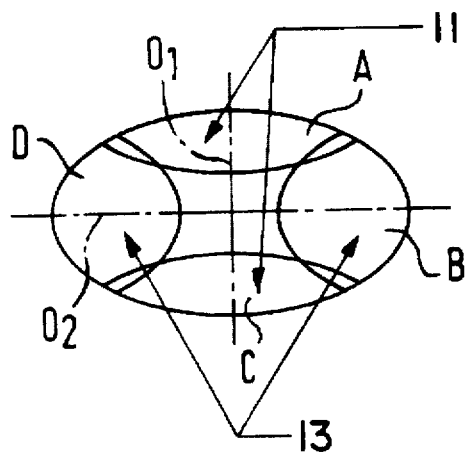
FIG. 3A is a schematic plan view showing laser beam patterns applied to a focusing photo-detector of the light detecting device shown in FIG. 1.
Figure 3B:
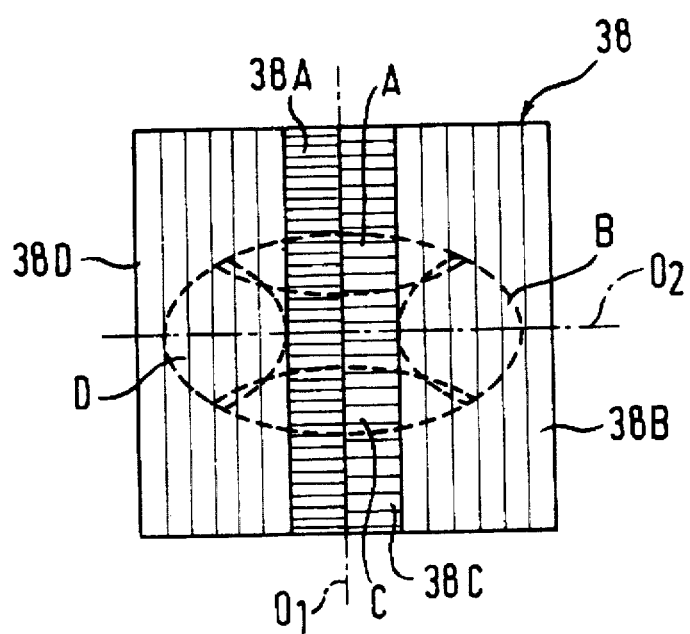
FIG. 3B is a plan view showing the relationship between hologram patterns and diffracted lights shown on a hologram plate of the light detecting device shown in FIG. 1.

The hologram plate 38 splits a laser beam spot with a specified optical characteristic given by the concave lens 23 into a plurality of beams as shown in FIG. 3B, and has a hologram pattern for guiding the split laser beams to specified detecting areas of the second photodetector 26 as shown in FIG. 3B.

The signal processor 8 is connected to a CPU 40, which is a main controller, has a read only memory (hereinafter referred to as ROM) 42 which stores initial data for operating the CPU 40 and a memory unit 44 containing a plurality of memories for temporarily storing information supplied for storage from the outside or data read from the optical disk (not shown) and data input via a host computer (not shown). A power supply device 46 to supply power to the signal processor 8 including the CPU 40 and the information recording/reproducing apparatus 2 is connected to the CPU 40.

The CPU 40 is connected to a laser driving circuit 52 to drive the laser element 20 for generating a laser beam having specified intensity of light, and a write beam generating circuit (a laser modulation circuit) 54 to modulate intensity of laser beam emitted from the laser element 20 corresponding to information stored in the memory unit 44 and to be written. Further, the CPU 40 is connected to an APC (Auto Power Control) circuit 56 connected to the monitor photo-detector 25 for defining a control volume to maintain intensity of the laser beam (detected by the monitor photo-detector 25 at a timing described later) emitted from the laser element 20 based on intensity of the laser beam reflected on the incident surface 32a of the correction prism 32. The output of the APC circuit 56 is input to the laser driving circuit 52 and is used for maintaining intensity of the laser begun emitted from the laser element 20 at a constant level.

The CPU 40 is also connected to a tracking control circuit 58 connected to the first photo-detector 24 for defining a driving volume of a mirror motor (not shown) of the galvano-mirror 34 based on a track shift volume detected by the tracking operation described later from the laser beam reflected on the optical disk. Further, the CPU 40 is connected to a focusing control circuit 60 connected to the second photo-detector 26 to define intensity of driving current to the focusing coil 18 for controlling the position of the object lens 10, that is, the lens holder 12 based on an out of focus volume detected by the focusing operation described later from the laser beam reflected on the optical disk.

FIG. 2B shows the detecting surface of the first photo-detector 24, that is, the shape of the detecting areas of the first through the fourth photo-detecting diodes 24A, 24B, 24C and 24D. FIG. 2C is a schematic diagram showing the flow of electric signal supplied to the tracking control circuit 58 from respective photo-diodes 24A, 24B, 24C and 24D.

As shown in FIG. 2B, the detecting areas of the first and the third photo-diodes 24A and 24C are smaller than those of the second and the fourth photo-diodes 24B and 24D and were formed in parallel between the detecting areas of the second and the fourth photo-diodes 24B and 24D along the shadow of the track in the state wherein the shadow of the recording track of the optical disk was projected.

Figure 2A:
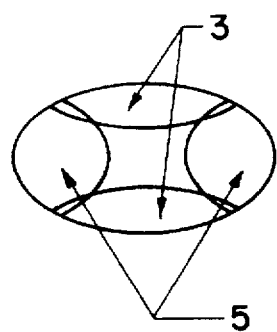
FIG. 2A is a schematic plan view showing laser beam patterns applied to a tracking photo-detector of the light detecting device shown in FIG. 1.
Figure 2B:
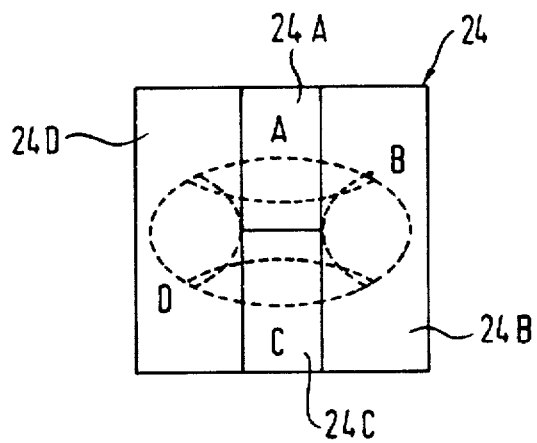
FIG. 2B is a schematic plan view showing detecting areas of the tracking photo-detector and the laser beam patterns projected to these detecting areas.
Figure 2C:
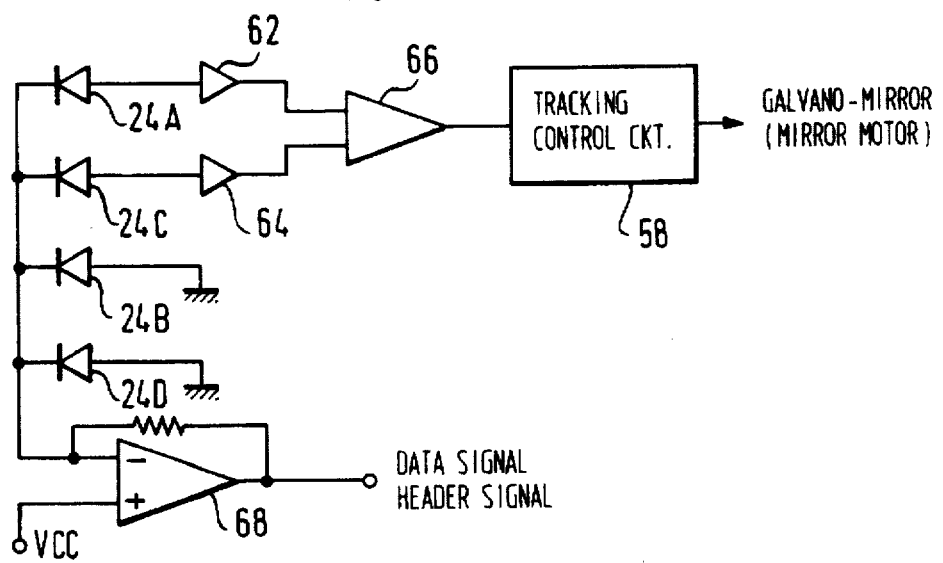
FIG. 2C is a circuit diagram showing a signal detecting process using the tracking photo-detector.

At this time, reflected laser beams containing laser beam components diffracted by the optical disk groove are projected to the first and the third photo-diodes 24A and 24C as shown in FIGS. 2A and 2B. Further, reflected laser beams containing both diffracted laser beam components by optical disk groove and diffracted laser beam by the header of the groove are projected on the second and the fourth photo-diodes 24B and 24D.

FIG. 2A shows the incident light beam pattern. 3 is the diffraction pattern occurring by the groove. 5 is the diffraction pattern occurring by the header.

Figure 5A:
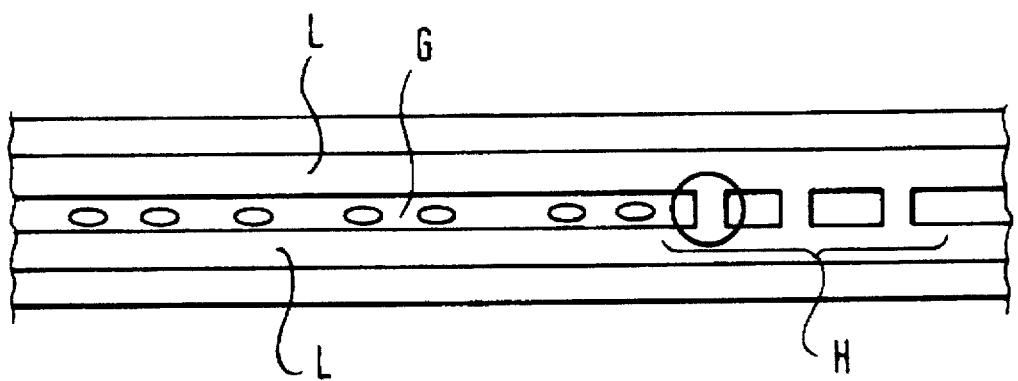
FIG. 5A is a schematic plan view showing a header formed on a track of a recording medium.
Figure 5B:
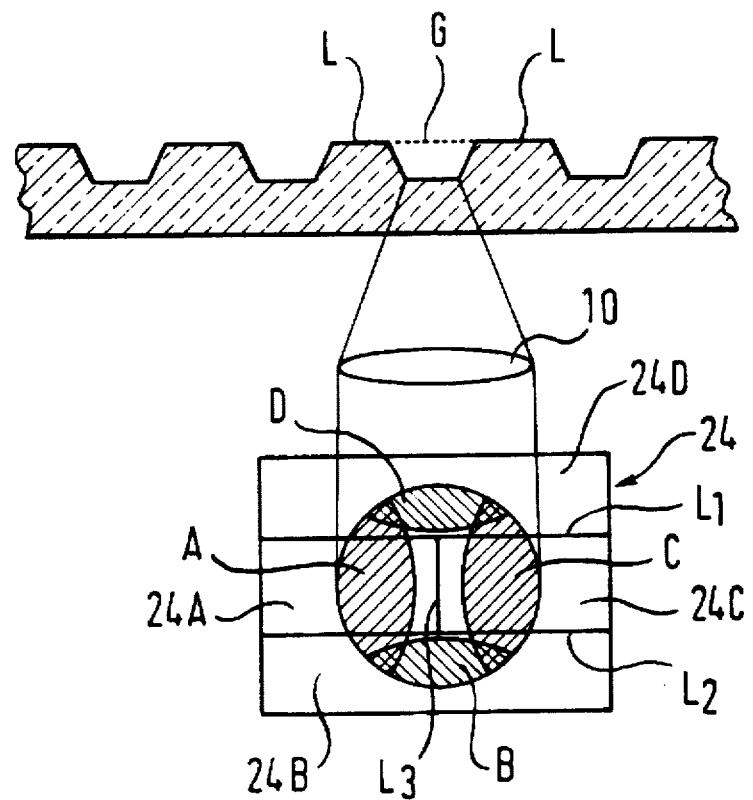
FIG. 5B is a schematic diagram showing the state of reflecting beam applied to photo-detectors from the header.

Here, the header denotes a point H which is an interrupted and discontinuous portion of the groove G between a pair of lands L formed on the recording surface of the optical disk as shown in FIGS. 5A and 5B. The groove G constitutes a recording track as well known. The reflected laser beam from the header H appears as a pair of upper and lower diffracted patterns B and D as shown in FIG. 5B.

The relationship between the arrangement of the first to fourth photo-diodes 24A to 24D of the first photo-detector 24 and the direction of the groove G is now described. That is, as shown in FIG. 5B, the first photo-detector 24 is divided into three portions by first and second lines $L_1$ and $L_2$ extending in the direction orthogonal to the extending direction of the groove G. At outside portions in the three portions, the second and fourth photo-diodes 24B and 24D are arranged. A portion between the first and second lines $L_1$ and $L_2$ is further divided into two portions by third line L3 extending in the direction along the direction of the groove G. On the two portions, the first and third photo-diodes 24A and 24C are arranged.

The reflected laser beams from the optical disk incident to the first and the third photo-diodes 24A and 24C are converted to electric signals corresponding to sizes of the beam spots projected on respective photo-diodes. Then the converted electric signals are taken out of the anodes of respective photo-diodes 24A and 24C, amplified to a specified level by amplifiers 62 and 64 and in succession, out of track volume is computed by a computing element 66 according to the following formula [Output of 62 (24A)–Output of 64 (24C)] and supplied to the tracking control circuit 58.

The out of track volume supplied to the tracking control circuit 58 is converted into a control volume corresponding to a volume to turn the galvano-mirror 34 in order to bring the center of the track on the recording surface of the optical disk to agree with the center of the laser beam passed through the object lens 10 and focused on a track. As laser beams diffracted by the groove header are not incident to the first and the third photo-diodes 24A and 24C, it becomes possible to control the tracking at a high accuracy.

As shown in FIG. 2C, the outputs from the cathodes of the first through the fourth photo-diodes 24A, 24B, 24C and 24D are added by an adder (not shown), differentially amplified by an amplifier 68 and taken out as the information recorded on the optical disk.

FIGS. 3A and 3B show the relationship between the hologram pattern of the hologram plate 38, which is arranged between the beam splitter 36 and the second photo-detector 26, and the reflected laser beam from the optical disk.

FIG. 3A shows the incident light beam pattern. 11 is the diffraction pattern occurring by the groove. 13 is the diffraction pattern occurring by the header.

As shown in FIG. 3B, the hologram pattern of the hologram plate 38 contains diffracted patterns A and C by the groove G (FIGS. 5A and 5B) and diffracted patterns B and D by the header H (FIGS. 5A and 5B) of which reflected laser beam applied to the second photo-detector 26 are orthogonal to each other. At this time, the first and the second hologram patterns 38B and 38D which diffract the diffracted patterns B and D in the direction away from the center line $O_1$, the third hologram pattern 38A which diffracts the diffracted pattern A in the direction parallel to the center line $O_1$ and away from the center line $O_2$, and the fourth hologram pattern 38C which diffracts the diffracted pattern C in the direction parallel to the center line $O_1$ and away from the center line $O_2$ are formed, respectively. The hologram plate 38 is so arranged that the optical axis O of the system passes through the intersecting point of the center lines $O_1$ and $O_2$. The third hologram pattern 38A has a narrower pitch than the fourth hologram pattern 38C in order to correspond to the position of the first and the third photo-diodes 26A and 26C of the second photodetector 26 shown in FIG. 4A. The detailed description will be omitted as it is well known that the more narrow the pitch of the hologram pattern is, the more large diffraction angle of the passed laser beams will become.

Figure 4B:
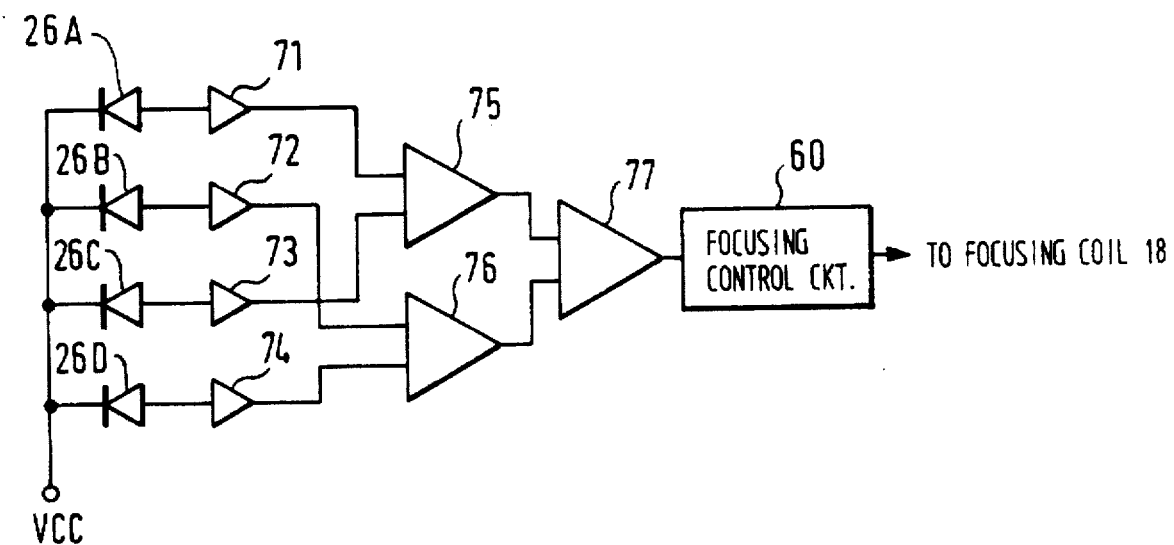
FIG. 4B is a circuit diagram showing a signal detecting process using the focusing photo-detector.

FIG. 4A shows the shape of the detection surface of the second photo-detector 26, that is, the shape of the detecting areas of the first through the fourth photo-diodes 26A, 26B, 26C and 26D. Shown in FIG. 4B is a circuit diagram showing the flow of the electric signals supplied to the focusing control circuit 60 from the photo-diodes 26A, 26B, 26C and 26D.

As shown in FIG. 4A, the detecting areas of the first through the fourth photo-diodes 26A through 26D are arranged at positions offset by a specified distance from the center of the second photo-detector 26. The center lines $O_1$ and $O_2$ of the second photo-detectors 26 are defined to be orthogonal to each other and so arranged that the optical axis O of the system of the optical disk apparatus 2 shown in FIG. 1 penetrates the intersecting point of the center lines $O_1$ and $O_2$. As shown by the dotted line in FIG. 4A, the fifth through the eighth photo-diodes 26A', 26B', 26C' and 26D' may be formed in one united body with the center of the second photo-detector 26 as a point of symmetry.

Here, the reflected laser beam from the pit of the optical disk is projected to the first and third photo-diodes 26A and 26C. If there are arranged the fifth and the seventh photo-diodes 26A' and 26C', the reflected laser beam from the pit of the optical disk is also projected to the point A and point C.

Further, on the center line $O_2$ of the second photo-detector 26, the reflected laser beam containing a laser beam diffracted by the header H of the groove G of the optical disk offset to the optical axis O of the system by the hologram plate 38 is projected. The 0-th optical component of the reflected laser beam is formed on the intersecting point of the center lines $O_1$ and $O_2$.

At this time, the reflected laser beam from the optical disk applied to the first and the third photo-diodes 26A and 26C are converted into electrical signals corresponding to size of the beam spots projected to the photo-diodes as shown in FIG. 4B, taken out of the anodes of the respective photo-diodes and amplified by amplifiers 71 and 73 to a specified level. In succession, they are added by an adder 75. Further, the outputs of the second and the fourth photo-diodes 26B and 26D ("0" in this embodiment) are taken out of the anodes of respective photo-diodes, amplified to a specified level by the amplifiers 72 and 74, and added by an adder 76.

Then, the outputs of the adders 75 and 76 are differentially amplified by a differential amplifier 77 and an out of focus amount is computed according to the formula;

[Output of 75 (26A+26C)−Output of 76 (26B+26D)].

The output of the differential amplifier 77 is supplied to the focusing control circuit 60.

The out of focus volume supplied to the focusing control circuit 60 is converted to a control volume corresponding to a volume to move the focusing coil 18 along the optical axis O of the system for the well-known focusing to bring a distance between the recording surface of the optical disk and the object lens 10 to agree with a distance for focusing laser beam by the object lens 10 after passing through the object lens 10. As no diffracted laser beam by the header H formed in the groove G is applied to the photo-diodes 26A, 26B, 26C and 26D, it becomes possible to detect out of focus volume at high accuracy.

Next, the operation of the information recording/reproducing apparatus shown in FIG. 1 will now be described.

When a power switch (not shown) of the optical disk apparatus 2 is turned ON, an initial program is read from the ROM 42 by the control of the CPU 40 and the optical disk apparatus is initialized.

Thereafter, a linear motor (not shown) is energized and the object lens 10 supported by the carriage 16 is moved to the center in the radial direction of the optical disk.

In succession, the focusing is directed to the laser driving circuit 52 by the CPU 40 based on the initial control information stored in the ROM 42. Thus, the laser driving current corresponding to a reproducing laser beam is supplied to the laser element 20 from the laser driving circuit 52. In the pre-emission, intensity of the laser beam generated from the laser element 20 is normally defined as the same as the reproducing laser beam.

The laser beam from the laser element 20 is reflected on the polarizing beam split surface 22a of the polarizing beam splitter 22, converted to a parallel beam by the collimator lens 28 and applied to the quarter wave plate 30. The polarized portion of the laser beam applied to the quarter wave plate 30 is converted to a circularly polarized beam and then, the beam spot is corrected to a round shape and guided to the galvano-mirror 34. A part of the laser beam guided to the correction prism 32 is reflected at a reflection factor of the incident surface 32a of the correction prism 32. This reflected laser beam is returned to the monitor detector 25 of the first photo-detector 24 at a specified angle against the optical axis of the system O and used for the APC described later.

Hereinafter, the laser beam reflected on the incident surface 32a of the correction prism 32 will be described.

The laser beam reflected on the incident surface 32a for APC pass through the quarter wave plate 30 and the collimator 28 in the state maintaining an angle θ against the optical axis O of the system and is returned to the polarizing beam split surface 22a of the polarizing beam splitter 22.

The laser beam returned to the polarizing beam split surface 22a for APC pass through the polarizing beam split surface 22a and the concave lens 23 and then, form an image on the monitor detector 25 in the state maintaining an angle θ against the optical axis O of the system. In this case, the incident surface 32a is arranged at a tilt of angle θ against the optical axis of the incident laser beams, that is, the optical axis O of the system. Accordingly, the reflected laser beam for APC are accurately guided to the monitor detector 25 only without being guided to the first through the fourth photo-diodes 24A through 24D of the first photo-detector 24. As a result, the intensity of laser beam output from the laser element 20 is detected accurately and the intensity of laser beam output from the laser element 20 which is driven through the laser driving circuit 52 is accurately set up.

On the other hand, the beam sectional shape of the laser beam applied to the galvano-mirror 34 after passing through the incident surface 32a, that is, the correction prism 32, is corrected to a round shaped, reflected and sent to the actuator 4.

The laser beam supplied to the actuator 4 from the galvano-mirror 34 is applied to the object lens 10 via a rising mirror (not shown) and then, applied to a specified track of the optical disk (not shown).

The laser beam led to a track of the optical disk is returned to the object lens 10 again after modulation of intensity according to existence of information (pits) recorded on the track and are returned to the polarizing beam splitter 22 passing through the galvano-mirror 34, the correction prism 32, the quarter wave plate 30 and the collimator lens 28 in order.

The reflected laser beam returned to the polarizing beam splitter 22 from the optical disk pass through the polarizing beam splitter surface 22a and is led to the beam splitter 36 via the concave lens 23.

The laser beam led to the beam splitter 36 is split to the first and the second laser beams having an equal intensity of light by the beam splitter 36 and applied to the first and the second photo-detectors 24 and 26, respectively. As already explained, the laser beam going to the second photo-detector 26 is applied in the state where its beam spot is further split to specified shapes by the hologram plate 38.

The reflected laser beam split by the beam splitter 36 and guided to the first photo-detector 24 is photoelectrically converted by the first through the fourth photo-diodes 24A, 24B, 24C and 24D, respectively. Then, currents taken out of the anodes of the first and the third photo-diodes 24A and 24C are processed according to the well-known out of tracking computing method and input to the tracking control circuit 58 under the control of the CPU 40.

That is, an instruction to rotate the galvano-mirror 34 by a specified angle is output to the tracking control circuit 58 from the CPU 40. Thereafter, the mirror motor (not shown) is slightly rotated in the specified direction by the mirror motor driving current output from the tracking control circuit 58 for driving the galvano-mirror 34. As a result, the center of the laser beam passing through the object lens 10 and the center of the track on the recording surface of the optical disk are aligned (tracking).

Similarly, the reflected laser beam which is split by the beam splitter 36, passed through the hologram plate 38 and guided to the second photo-detector 26 is applied to the first and the third photo-diodes 26A and 26C and photo-electrically converted, respectively. Here, the currents taken out of the anodes of the first and the third photo-diodes 26A and 26C are processed according to the well-known out of focusing volume computing method and input to the focusing control circuit 60 under the control of the CPU 40. That is, an instruction is output to the focusing control circuit 60 from the CPU 40 for moving the focusing coil 18, that is, the lens holder 12 by a specified distance. Then, the lens holder 12 is moved by a specified distance in the specified direction by the focusing coil driving current output from the focusing control circuit 60 for driving the focusing coil 18 according to the instruction from the CPU 40. As a result, the position for focusing the laser beam passed through the object lens 10 and the distance between the object lens 10 and the recording surface of the optical disk are aligned (focusing).

In this case, as laser beam diffracted by time header H of the groove G on the recording surface of the optical disk is focused at the positions largely away from the detecting areas of the first and the third photo-diodes 26A and 26C. As a result, it is possible to prevent out-of-focusing volume of the reflected laser beam passed through the hologram plate 38 from being erroneously detected by the diffracted laser beam from the header H.

Thus, the focusing of the object lens 10 and the tracking of track error components produced with the eccentricity of the optical disk and the shift of supporting position of the disk motor (not shown) in the calibration area positioned in the most inner side recordable area of the optical disk are controlled. A spiral track defined to a single track from the most inner circumference toward the most outer circumference and a number of concentric tracks arranged are known as the tracks formed on the optical disk. In a case where any tracks are used, when the optical disk is rotated by one turn (one revolution), deflection is produced by DC component of residual error of out of tracking signal and it is therefore possible to compensate tracking continuously by inputting DC component by the well-known double loop tracking into a linear motor control circuit (not shown). Accordingly, even when data to be recorded is in excess of one revolution of the track, it is prevented to record data over a track on which data was already recorded.

In succession, if the operation mode of the information recording/reproducing apparatus 2 is "Recording", the carriage 16 is moved toward the outer circumference in the radial direction of the optical disk by a specified distance at a specified speed by the control of the linear motor driving circuit (not shown) under the control of the CPU 40. The current position of the carriage 16, that is, the object lens 10 is detected through a scale (not shown) and reported to the CPU 40. In addition, the current position of the object lens 10 which is detected through the scale is fed back to the linear motor control circuit.

Thereafter, the same tracking process as that in the calibration area described above and the focusing process are repeated on the object lens 10 and the recording surface of the optical disk, and the tracking and the focusing are aligned on a specified track where information is to be recorded.

In succession, under the control of the CPU 40, intensity of the laser driving current which is output from the laser driving circuit 52 is switched so that intensity of laser beam output from the laser element 20 is brought to agree with intensity of beam optimized for recording information on the optical disk. A recording laser beam having intensity for this recording is converted to code train corresponding to data to be recorded by the write beam generating circuit 54 and applied to the recording surface of the optical disk. As a result, the intensity of laser beam output from the laser element 20 is switched sequentially to a recording beam which is capable of changing a transmission factor of the recording surface of the optical disk and information is recorded on the optical disk. The intensity of a recording laser beam is set at 5–10 times of that of laser beam for reproducing.

On the other hand, if the operation mode of the information recording/reproducing apparatus 2 is "Reproducing", under the control of the CPU 40 corresponding to information input by a host computer (not shown) or a retrieval apparatus, for instance, a file name, the carriage 16 is moved by a specified distance toward the outer circumference in the radial direction of the optical disk at a specified speed by the control of the linear motor driving circuit. The current position of the carriage 16, that is, the object lens 10 is detected via a scale (not shown) and reported to the CPU 40. Further, the current position of the object lens 10 detected by the scale is fed back to the linear motor control circuit.

Thereafter, the same tracking process as that in the calibration area as described above and the focusing process are repeated on the object lens 10 and the recording surface of the optical disk, and the focusing and the tracking are aligned on a specified track on which information is reproduced.

In succession, the size of laser driving current that is output from the laser driving circuit 52 is switched under the control of the CPU 40 so that the intensity of laser beam output from the laser element 20 is brought to agree with the intensity of light optimized for reproducing information on the optical disk.

The laser beam output from the laser element 20 is reflected on the polarizing beam split surface 22a of the polarizing beam splitter 22, converted to a parallel beam by the collimator lens 28 and applied to the quarter wave plate 30. The laser beam applied to the quarter wave plate 30 is led to the galvano-mirror 34 after its polarized beam is converted to the round polarized beam and its beam spot is corrected to a round shape.

The laser beam output from the galvano-mirror 34 and supplied to the actuator 4 is applied to the object lens 10 via a rising mirror (not shown) and then, is applied to a specified track on the optical disk.

The laser beam led to the specified track of the optical disk is returned again to the object lens 10 after its intensity is modulated according to existence of information (that is, pits) recorded on the track and then, returned to the polarizing beam splitter 22 after passing through the galvano-mirror 34, the correction prism 32, the quarter wave plate 30 and the collimator lens 28.

The reflected laser beam returned to the polarizing beam splitter 22 from the optical disk pass through the polarizing beam split surface 22a and is led to the beam splitter 36 via the concave lens 23.

The laser beam led to the beam splitter 36 is split into a first and a second laser beam having an equal light intensity applied to the first and the second photo-detectors 24 and 26, respectively for image forming. The laser beam going to the second photo-detector 26 is applied for image forming in the state where the beam spot is further split into specified shapes by the hologram plate 38 as described above.

The reflected laser beam split by the beam splitter 36, passed through the hologram plate 38 and guided to the second photo-detector 26 is photoelectrically converted by the first and the third photo-diodes 26A and 26C and is converted to out of focusing volume under the control of the CPU 40. That is, an instruction to move the focusing coil 18, that is, the lens holder 12 by a specified distance is output to the focusing control circuit 60 from the CPU 40. The lens holder 12 is moved by a specified distance in the specified direction by the focusing coil driving current for driving the focusing coil 18 that is output from the focusing control circuit 60 according to the instruction of the CPU 40. As a result, the object lens 10 focuses the reflected laser beam on the recording surface of the optical disk.

In detail, the reflected laser beam from the optical disk applied to the first and the third photo-diodes 26A and 26C is converted to electrical signals corresponding to sizes of beam spots projected to respective photo-diodes and then, taken out of the anodes of respective photo-diodes, amplified to specified levels by the amplifiers 71 and 73 and added by the adder 75. Similarly, the outputs of the second and the fourth photo-diodes 26B and 26D are taken out of the anodes of respective photo-diodes, amplified to specified levels by the amplifiers 72 and 74 and added up by the adder 76.

Then, the outputs of the adders 75 and 76 are differentially amplified and out of focusing volume is computed by the differential amplifier 77 according to the following formula:

[Output of 75 (26A+26C)−Output of 76 (26B+26D)]

The output of the differential amplifier 77 supplied to the focusing control circuit 60, that is, out of focusing volume is converted to a control volume corresponding to a distance to move the focusing coil 18 along the optical axis O of the system for the well-known focusing to bring a distance between the recording surface of the optical disk and the object lens 10 to agree with a focusing distance of the laser beam passed through the object lens 10. In this case, as a laser beam diffracted by the header H of in the groove G is not applied to respective photo-diodes 26A, 26B, 26C and 26D, it becomes possible to detect out of focusing volume at a high accuracy.

As described above, according to the present invention, the second photo-detector has the first through the fourth photo-diodes in the specified shape to which the diffracted laser beam from the header in the groove on the recording surface of the optical disk is not applied.

The first through the fourth photo-diodes of the second photo-detector are arranged with specified spaces on the optical axis of the system in the surface containing the first direction orthogonal to the optical axis of the system penetrating the hologram plate and the second direction which is further orthogonal to the first direction including the optical axis of the system.

Further, the hologram plate applies the reflected laser beam by splitting it for each of diffracted laser beam groups produced by the grooves on the recording surface of the optical disk including the first direction orthogonal to the optical axis of the system penetrating the hologram plate and the second direction which is further orthogonal to the first direction including the optical axis of the system.

Thus, only a laser beam of a signal component without a diffracted laser beam from the header in the groove is applied to the second photo-detector through the hologram plate which applies a reflected laser beam by splitting it for each of diffracted laser beam groups produced by the grooves on the recording surface of the optical disk for the first through the fourth photo-diodes.

Furthermore, the object lens is positioned precisely at a specified position based on a volume precisely detected without being affected by the non-signal component light produced by grooves on the recording surface. The hologram plate splits the laser beam for each of the diffracted laser beam groups produced by the grooves on the recording surface and the second photo-detector which outputs a signal corresponding to the intensity of the signal component laser beam of reflected light from the optical disk guided to a specified position by the hologram plate to the surface containing the first direction orthogonal to the optical axis of the system and the second direction which is further orthogonal to the first direction including the optical axis of the system in connection with a deviation between a space between the object lens and the recording surface of the optical disk and a focusing distance of the laser beams on the recording surface through the object lens.

Thus, information recorded on an optical disk is accurately reproduced.

What is claimed is:

1. A light detecting device comprising:

means for leading a light beam from a light source to a recording medium having a groove and a header portion formed by interrupting the groove; and means for detecting the light beam reflected from the recording medium and led by the leading means and outputting a signal corresponding to an intensity of the reflected light beam, the light beam detecting means including a light beam detecting surface having an area on which a component of the reflected light beam from the header portion is not incident.

2. A light detecting device as claimed in claim 1, wherein the light beam detecting means includes first, second, third and fourth detecting regions, the second and the fourth detecting regions are outer regions defined by dividing the light beam detecting means into three portions along lines parallel to a first direction orthogonal to an extending direction of the groove, the second and the fourth detecting regions being irradiated by the component of the reflected light beam from the header portion, and the first and the third detecting regions corresponding to the area and being defined by dividing one portion of the three portions of the light beam detecting means, located between the second and the fourth detecting regions, into two portions in a second direction parallel to the extending direction of the groove, the first and the third detecting regions not being irradiated by the component of the reflected light beam.

3. A light detecting device comprising:

a light source to generate a light beam;

means for focusing the light beam from the light source on a groove formed on a recording medium and taking out the light beam reflected from the groove;

means for tracing the groove so that the light beam irradiates the groove;

means for detecting the light beam reflected from the groove and outputting a signal corresponding to an intensity of the reflected light beam, the light beam detecting means including first, second, third and fourth detecting regions in which the second and the fourth detecting regions receive a diffracted light beam contained in the reflected light beam, the diffracted light beam being diffracted by a header portion of the recording medium, the header portion being formed by interrupting the groove, and the first and the third detecting regions located between the second and the fourth detecting regions, the first and the third detecting regions not receiving the diffracted light beam being diffracted by the header portion; and means for controlling the tracing means to align the light beam with the groove based on a differential signal obtained by subtracting between a first signal output from the first detecting region and a second signal output from the third detecting region.

4. A light detecting device as claimed in claim 3 further comprising means for reproducing information based on an adding signal obtained by adding four signals output from the first, the second, the third and the fourth detecting regions.

5. A light detecting device as claimed in claim 3, wherein the second and the fourth detecting regions of the light beam detecting means are outer regions defined by dividing the light beam detecting means into three portions along lines parallel to a first direction, and the first and the third detecting regions are defined by dividing one portion of the three portions of the light beam detecting means between the second and the fourth detecting regions into two portions in a second direction orthogonal to the first direction.

6. A light detecting device comprising:

means having an optical axis for leading a light beam along the optical axis from a light source to a recording medium;

wave front splitting means for splitting the light beam reflected from the recording medium for each of a plurality of diffracted light groups generated depending on a characteristic of a surface of the recording medium; and means for detecting the reflected light beam from the recording medium after having passed through the wave front splitting means and outputting a signal corresponding to an intensity of the reflected light beam, the light beam detecting means including a light beam detecting surface having an area in a specified shape so that a component of the reflected light beam produced by a header portion of the recording medium is not incident on the area, the header portion being formed by interrupting a groove formed on the recording medium.

7. A light detecting device as claimed in claim 6, wherein the wave front splitting means includes a hologram plate.

8. A light detecting device as claimed in claim 7, wherein a hologram pattern of the hologram plate contains first and third diffracted patterns diffracted by the groove and second and fourth diffracted patterns diffracted by the header portion, the first and the third diffracted patterns being orthogonal to the second and the fourth diffracted patterns.

9. A light detecting device as claimed in claim 6, wherein the light beam detecting means is arranged at a specified position away from the optical axis in a surface including a first direction orthogonal to the optical axis penetrating the wave front splitting means and a second direction and which is further orthogonal to the first direction including the optical axis.

10. A light detecting device comprising:

a light source;

means having an optical axis for leading a light beam along the optical axis from the light source to a recording medium having a recording track;

wave front splitting means for splitting the light beam reflected from the recording medium for each one of a plurality of diffracted light groups generated depending on a characteristic of a surface of the recording medium; and means for detecting the reflected light beam from the recording medium passed through the wave front splitting means after being led by the leading means to output a signal corresponding to an intensity of the reflected light beam, the light beam detecting means being arranged at a specified position away from the optical axis in a surface including a first direction orthogonal to the optical axis penetrating the wave front splitting means and a second direction which is further orthogonal to the first direction including the optical axis, the light beam detecting means including a light beam detecting surface having an area in a specified shape so that a component of the reflected light beam diffracted by a header portion of the recording medium is not incident on the area, the header portion being formed by interrupting a groove formed in the recording medium; and means for controlling the leading means to focus the light beam onto the recording track.

11. A light detecting device comprising:

a light source to generate a light beam;

means for leading the light beam from the light source to a groove formed on a recording medium and taking out the light beam reflected from the groove;

means for tracing the groove so that the light beam irradiates the groove;

means for splitting the light beam reflected from the groove into first and second light beams;

first detection means for detecting the first light beam and outputting a signal corresponding to an intensity of the first light beam, the first detection means including first, second, third and fourth detecting regions in which the second and the fourth detecting regions receive a diffracted light beam contained in the first light beam, and the first and the third detecting regions being located between the second and the fourth detecting regions;

wave front splitting means for splitting the second light beam for each one of a plurality of diffracted light groups generated depending on a characteristic of a surface of the recording medium;

second detection means for detecting the second light beam passed through the wave front splitting means and outputting a signal corresponding to an intensity of the second light beam, the second detection means being arranged at a specified position away from the optical axis in a surface including a first direction orthogonal to the optical axis penetrating the wave front splitting means and a second direction which is further orthogonal to the first direction including the optical axis;

first control means for controlling the tracing means to align the light beam with the groove based on a differential signal obtained by subtracting between the signal output from the first detecting region and the signal output from the third detecting region;

means for reproducing information based on an adding signal obtained by adding four signals output from the first, the second, the third and the fourth detecting regions; and second control means for controlling the leading means to focus the light beam onto the groove based on the output signal output from the second detection means, wherein:

the second and the fourth detecting regions receive a component of the reflected light beam diffracted by a header portion of the recording medium, the header portion being formed by interrupting the groove, and the first and the third detecting region not receiving the component of the reflected light beam.

* * * * *